(12) United States Patent
Yamada

(10) Patent No.: US 7,865,007 B2
(45) Date of Patent: Jan. 4, 2011

(54) MICROSCOPE SYSTEM, OBSERVATION METHOD AND OBSERVATION PROGRAM

(75) Inventor: Tatsuki Yamada, Tokyo (JP)

(73) Assignee: Olympus Corporation, Tokyo (JP)

( * ) Notice: Subject to any disclaimer, the term of this patent is extended or adjusted under 35 U.S.C. 154(b) by 1101 days.

(21) Appl. No.: 11/589,529

(22) Filed: Oct. 30, 2006

(65) Prior Publication Data

US 2008/0100703 A1 May 1, 2008

(51) Int. Cl.
  *G06K 9/20* (2006.01)
  *G06K 9/36* (2006.01)
(52) U.S. Cl. .................. 382/133; 382/239; 382/318
(58) Field of Classification Search .................. None
  See application file for complete search history.

(56) References Cited

U.S. PATENT DOCUMENTS

| 6,272,235 B1 * | 8/2001 | Bacus et al. ............... 382/133 |
| 6,522,774 B1 | 2/2003 | Bacus et al. |
| 2005/0190437 A1 | 9/2005 | Nakagawa |
| 2006/0204072 A1 | 9/2006 | Wetzel et al. |
| 2007/0053594 A1 | 3/2007 | Hecht et al. |

FOREIGN PATENT DOCUMENTS

| EP | 0 994 433 A1 | 4/2000 |
| EP | 1 617 377 A | 1/2006 |
| JP | 09-281405 A | 10/1997 |
| JP | 2001-519944 A | 10/2001 |
| JP | 2002-514319 A | 5/2002 |
| JP | 2003-295063 A | 10/2003 |
| JP | 2004-151623 A | 5/2004 |
| JP | 2004-514920 A | 5/2004 |
| JP | 2005-037902 A | 2/2005 |
| WO | WO 98/39728 A1 | 9/1998 |
| WO | WO 98/44446 A1 | 10/1998 |
| WO | WO 01/27678 A | 4/2001 |
| WO | WO 01/84209 A2 | 11/2001 |

OTHER PUBLICATIONS

European Patent Office Communication dated Feb. 19, 2009, issued in a counterpart European Application Serial No. 06 022 728.7-2217.

* cited by examiner

*Primary Examiner*—Brian P Werner
(74) *Attorney, Agent, or Firm*—Holtz, Holtz, Goodman & Chick, PC

(57) ABSTRACT

It is possible to provide a microscope system, capable of constructing a wide vision and high definition microscope image without requiring a work by a pathologist, of reducing a storage capacity for recording and storing after a pathologist observing and/or determining a diagnosis, and of forming and displaying a wide vision and high definition microscope image by comprising means for obtaining image information of the entirety, or a part, of a sample by moving an object lens and a sample relatively to each other in the perpendicular direction against an optical axis, means for designating a specific zone of the obtained image information, means for storing image information of the designated specific zone, means for reducing an information volume of image information not designated among the obtained image information, means for storing the reduced image information, and means for storing a positional relationship between these pieces of stored image information.

1 Claim, 14 Drawing Sheets

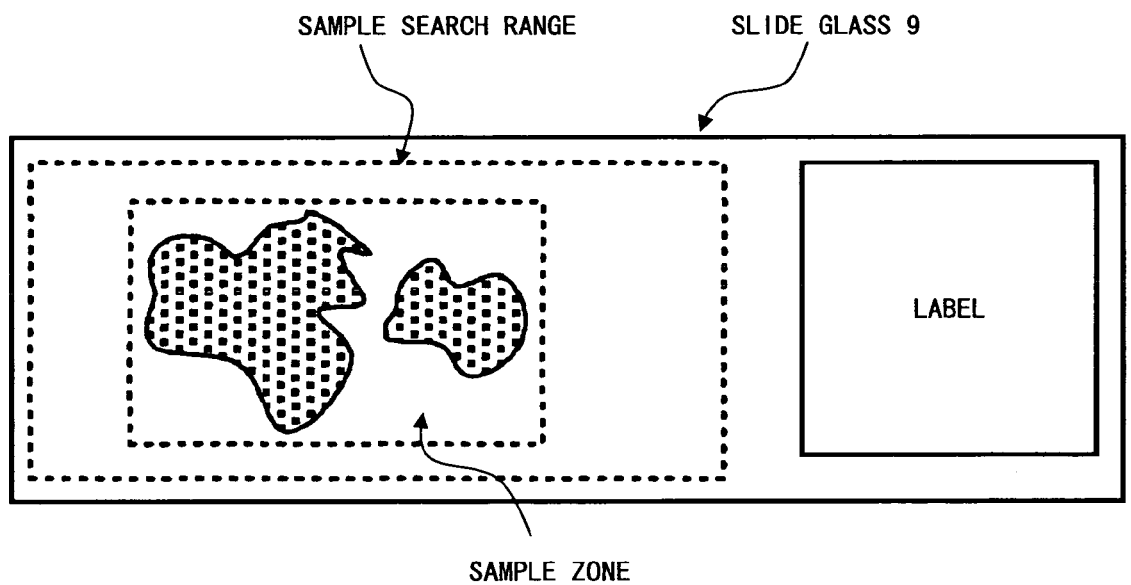
F I G. 3

| ARRAY NUMBER | | | STAGE COORDINATES | | |
|---|---|---|---|---|---|
| X AXIS | Y AXIS | Z AXIS | X AXIS | Y AXIS | Z AXIS |
| | | | | | |
| | | | | | |
| | | | | | |
| | | | | | |

F I G. 5

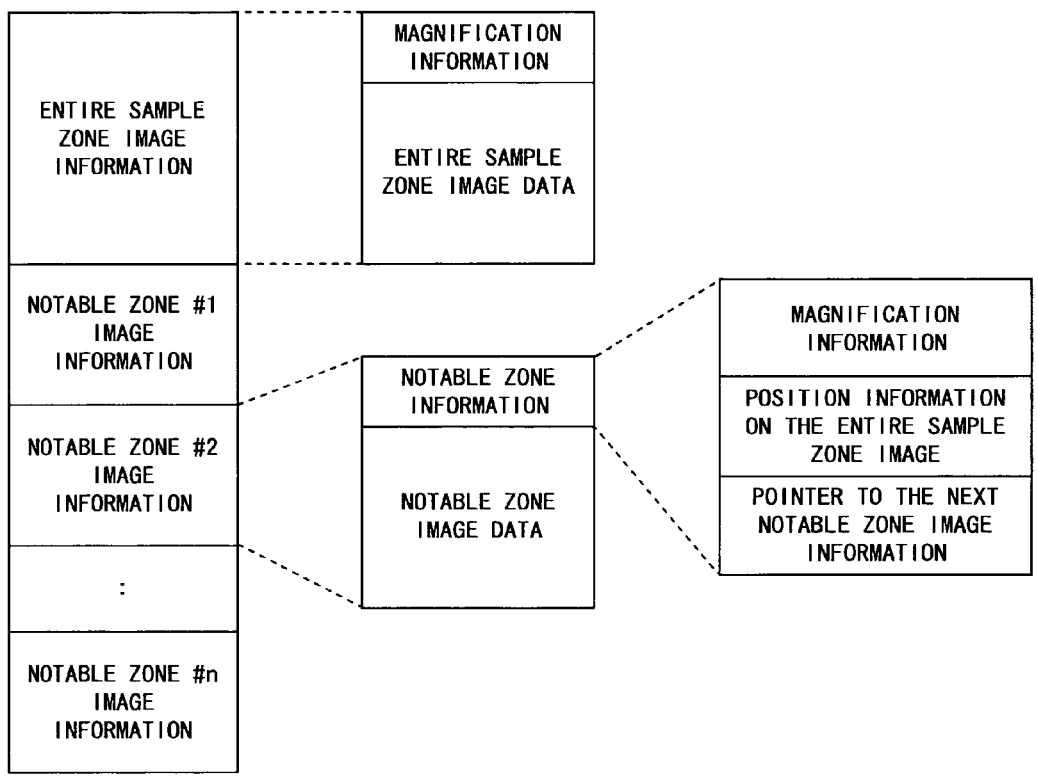
F I G. 8

MICROSCOPE SYSTEM, OBSERVATION METHOD AND OBSERVATION PROGRAM

BACKGROUND OF THE INVENTION

1. Field of the Invention

The present invention relates to a microscope system for recording and observing a wide vision and high definition digital image of the entirety, or a part of, a sample by using a microscope, an observation method used by a microscope system and an observation program therefor.

2. Description of the Related Art

Conventionally, an observable range at once is mainly determined by a magnification of an object lens in the case of observing a sample by using a microscope. Larger the magnification, higher the definition of an image on one hand, narrower the observation range on the other. Accordingly being performed is to photograph a plurality of images by moving the vision by using a motorized stage, et cetera, and adhere or combine them together, thereby making a wide vision and high definition microscope image for utilizing in a pathological diagnosis (e.g., refer to Laid-Open Japanese Patent Application Publication Nos. 09-281405, 2003-295063; Japanese Translation of PCT International Application Nos. 2001-519944, 2002-514319, 2004-514920).

Furthermore, similar methods are performed for obtaining a three-dimensional wide vision and high definition microscope image having different focus positions (e.g., refer to Laid-Open Japanese Patent Application Publication Nos. 2004-151263, 2005-37902).

The purpose of the present invention is to provide a microscope system capable of constructing a wide vision and high definition (including a slice image having different focus positions) microscope image without requiring a work by an expert such as a pathologist, of reducing a storage capacity for recording and storing after a pathologist observing and/or determining a diagnosis, and of forming and displaying a wide vision and high definition microscope image; and an observation method and observation program for use in the microscope system.

SUMMARY OF THE INVENTION

That is, a microscope system according to an aspect of the present invention comprises image information obtainment means for obtaining image information of the entirety, or a part, of a sample by moving an object lens and a sample relatively to each other in the perpendicular direction against an optical axis; specific zone designation means for designating a specific zone of the image information obtained by the image information obtainment means; specific zone image storage means for storing image information of the specific zone designated by the specific zone designation means; image information reduction means for reducing an information volume of image information being not designated by the specific zone designation means among the image information obtained by the image information obtainment means; reduction image storage means for storing the image information reduced by the image information reduction means; and image position relationship storage means for storing a positional relationship between the image information stored by the specific zone image storage means and the image information stored by the reduction image storage means.

BRIEF DESCRIPTION OF THE DRAWINGS

The present invention will be more apparent from the following detailed description when the accompanying drawings are referenced.

FIG. 3 is a diagram showing a sample placed on a slide glass;

FIG. 5 is a diagram showing a coordinate map for obtaining a microscope image;

FIG. 8 is a diagram showing a first example of a file structure of a wide vision and high definition microscope image attached with a notable part;

DESCRIPTION OF THE PREFERRED EMBODIMENTS

Figure 1:
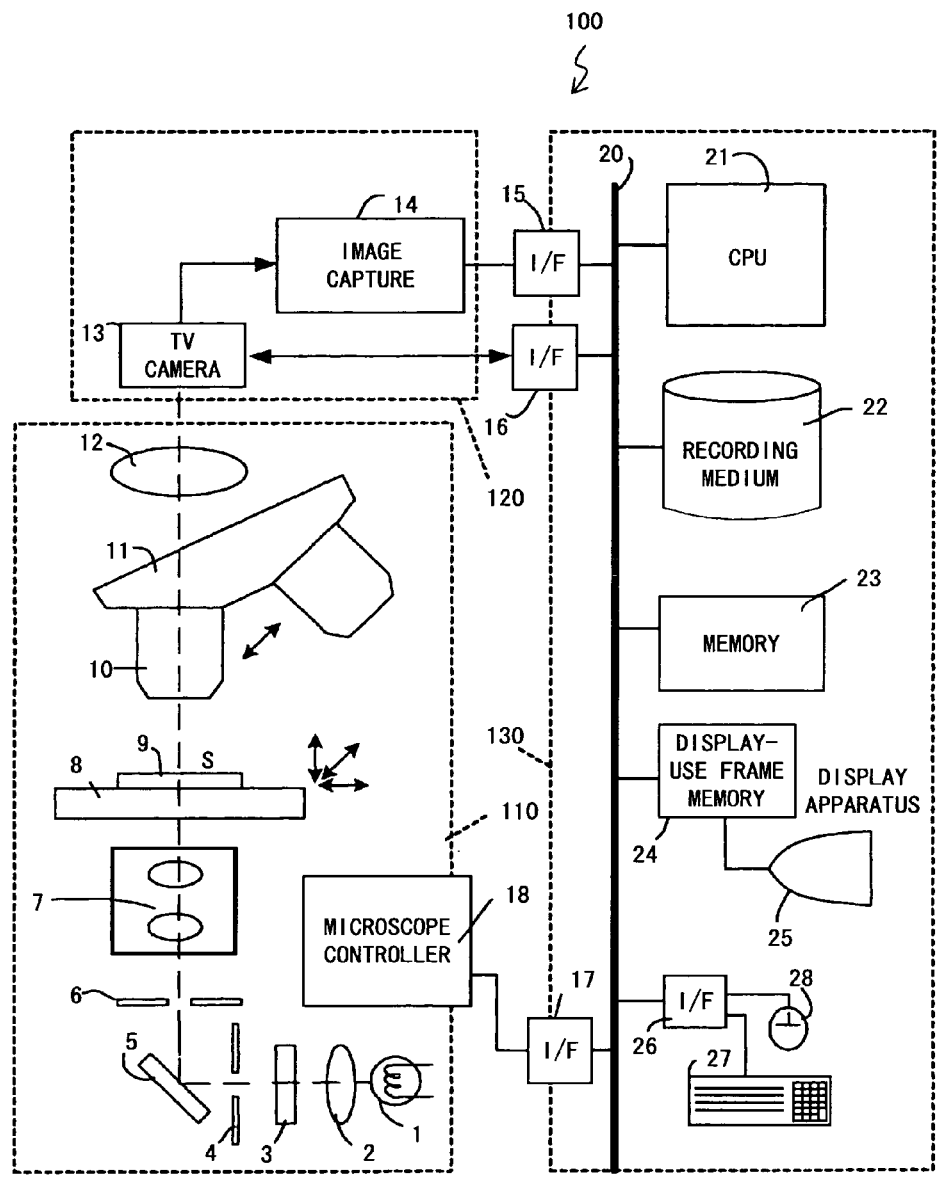
FIG. 1 is a diagram showing an overall comprisal of a microscope system according to a first embodiment.

The following is a description of the preferred embodiment of the present invention by referring to the accompanying drawings.

That is, a microscope system according to an aspect of the present invention comprises image information obtainment means for obtaining image information of the entirety, or a part, of a sample by moving an object lens and a sample relatively to each other in the perpendicular direction against an optical axis; specific zone designation means for designating a specific zone of the image information obtained by the image information obtainment means; specific zone image storage means for storing image information of the specific zone designated by the specific zone designation means; image information reduction means for reducing an information volume of image information being not designated by the specific zone designation means among the image information obtained by the image information obtainment means; reduction image storage means for storing the image information reduced by the image information reduction means; and image position relationship storage means for storing a positional relationship between the image information stored by the specific zone image storage means and the image information stored by the reduction image storage means.

This configuration makes it possible to construct a wide vision and high definition microscope image by an operation of a general operator instead of a pathology expert, and construct a wide vision and high definition microscope image reducing a storage capacity while maintaining an appropriate amount of necessary image information by recording only an important part for a diagnosis in a high definition while reducing an information volume, such as resolution, for the entirety of an image of a sample (noted as a "sample image" hereinafter).

Meanwhile, a microscope system according to the present invention preferably comprises entire zone image display means for displaying, in a discretionary magnification, the entirety of a sample image constituted by the image information stored by the specific zone image storage means and constituted by the image information stored by the reduction image storage means; specific zone image display means for displaying the image information stored by the specific zone image storage means in a discretionary magnification; specific zone display means for displaying image information designated by the specific zone designation means among the image displayed by the specific zone image display means; sample entirety navigation means for displaying, in a rectangle, a zone of the image information displayed by the specific zone image display means within the entire sample image displayed by the entire zone image display means; and specific zone navigation means for displaying a zone indicating the image information displayed by the specific zone image display means within the image information displayed by the specific zone image display means.

This configuration makes it possible to observe figures of a series of microscope images ranging from an entire sample image to a strong magnification image while grasping a positional relationship of the present observation part.

Also, a microscope system according to the present invention is preferably configured so that the image information obtainment means is capable of moving an object lens and a sample relatively to each other in the perpendicular direction against the optical axis and in the optical axis direction, thereby obtaining three-dimensional image information of the entirety of the sample or a part thereof.

This configuration enables a response to a three-dimensional wide vision and high definition image with different focus positions and a figure observation of a necessary part in a strong magnification and various focus positions.

Also, according to an aspect of the present invention, an observation method which is one carried out by a microscope system comprises: obtaining image information of the entirety, or a part, of a sample by moving an object lens and a sample relatively to each other in the perpendicular direction against an optical axis; designating a specific zone of the obtained image information; storing image information of the designated specific zone in a specific zone image database; reducing an information volume of image information not designated among the obtained image information; storing the reduced image information in a reduction image database; storing a positional relationship between image information stored in the specific zone image database and one stored in the reduction image database; displaying, in a discretionary magnification, the entirety of a sample image constituted by image information stored in the specific zone image database and one stored in the reduction image database; displaying, in a discretionary magnification, image information stored in the specific zone image database; displaying the designated image information among the displayed image information; displaying, in a rectangle, a zone indicating image information of the displayed specific zone within the entirety of the displayed sample image; and displaying, in a rectangle, a zone indicating image information of the displayed specific zone within the image information of the displayed specific zone.

This configuration makes it possible to construct a wide vision and high definition microscope image by an operation of a general operator instead of a pathology expert, and construct a wide vision and high definition microscope image reducing a storage capacity while maintaining an appropriate amount of necessary image information by recording only an important part for a diagnosis in a high definition while reducing an information volume, such as resolution, for the entirety of a sample image. This also makes it possible to observe figures of a series of microscope images ranging from an entire sample image to a strong magnification image while grasping a positional relationship of the presently observing part.

Also, according to an aspect of the present invention, an observation program which is one to be executed by a microscope system comprises the procedures of: obtaining image information of the entirety, or a part, of a sample by moving an object lens and a sample relatively to each other in the perpendicular direction against an optical axis; designating a specific zone of the obtained image information; storing image information of the designated specific zone in a specific zone image database; reducing an information volume of image information not designated among the obtained image information; storing the reduced image information in a reduction image database; storing a positional relationship between image information stored in the specific zone image database and one stored in the reduction image database; displaying, in a discretionary magnification, the entirety of a sample image constituted by image information stored in the specific zone image database and one stored in the reduction image database; displaying, in a discretionary magnification, image information stored in the specific zone image database; displaying the designated image information among the displayed image information; displaying, in a rectangle, a zone indicating image information of the displayed specific zone within the entirety of the displayed sample image; and displaying, in a rectangle, a zone indicating image information of the displayed specific zone within the image information of the displayed specific zone.

This configuration makes it possible to construct a wide vision and high definition microscope image by an operation of a general operator instead of a pathology expert, and construct a wide vision and high definition microscope image reducing a storage capacity while maintaining an appropriate amount of necessary image information by recording only an important part for a diagnosis in a high definition while reducing an information volume, such as resolution, for the entirety of a sample image. This also makes it possible to observe figures of a series of microscope images ranging from an entire sample image to a strong magnification image while grasping a positional relationship of the presently observing part.

The first is a description on a first embodiment.

FIG. 1 is a diagram showing an overall comprisal of a microscope system according to the first embodiment.

The microscope system 100 comprises a microscope unit 110, an image input unit 120 and a control computer unit 130 equivalent to a commercially available personal computer (PC).

Now, the first description is on the microscope unit 110.

It is configured to generate an illumination light from a transmissive illumination light source 1 comprising a halogen lamp for example, condense the light by a collector lens 2, and let it pass through various filters 3 (e.g., a neutral density (ND) filter, an LBD filter (i.e., a blue filter), et cetera), followed by narrowing the illumination field by a view angle aperture 4 and deflecting an angle toward the direction of a stage 8 by a mirror 5.

The deflected illumination light by an angle toward the direction of the stage 8 by the mirror 5 passes through an aperture stop 6 and a condenser lens unit 7, followed by passing through an illumination-use opening part (not shown herein) on the stage 8, thereby being capable of illuminating a sample S placed on a slide glass 9 on the stage 8. An object lens 10 is configured to be selectively insertable into the light path by a plurality of object lenses 10 being held by a revolver 11 on the overhead of the stage 8.

The sample image on the slide glass 9 which is incident to the object lens 10 is guided to an imaging lens 12 by way of a television (TV) camera 13.

The sample image picked up by the TV camera 13 is digitized by an image capture circuit 14 to be imported into the control computer unit 130.

Note that respective parts within the microscope unit 110 are equipped with motors, motor drivers, sensors, et cetera, which are not shown herein, for controlling them electrically; and driving of the respective parts are controlled by a central processing unit (CPU) 21 way of a microscope unit control interface (I/F) circuit 17 and a microscope controller 18.

For example, enabled are controls for moving the various filters 3, such as an ND filter for adjusting an illumination light volume, into and out of the light path, controls for opening and closing the view angle aperture 4 and aperture stop 6, three-dimensional (i.e., X, Y and Z axes) controls for moving the stage 8 in an X-Y plane which is perpendicular to the optical axis and in the Z direction in parallel therewith and controls for rotating the revolver 11 for selectively inserting the object lens into the light path. The movement controls in the Z direction may of course be configured for a driving control of the revolver 11 holding the object lens in lieu of driving the stage 8.

The next is a description on the image input unit 120.

The TV camera 13 is controlled by way of a control-use I/F circuit 16 based on a control instruction from the CPU 21.

Then, a microscope sample image picked up by the TV camera 13 is digitized by the image capture circuit 14, and stored in memory 23 by way of an image capture I/F circuit 15, followed by an image being displayed in a display apparatus 25 and being stored in a recording medium 22 as an image file.

The next is a description on the control computer unit 130.

In the present microscope system 100, the CPU 21 plays a central role for controlling the above noted microscope unit 110 and image input unit 120. The CPU 21 is connected to a CPU bus 20 which further connects the control-use I/F circuit 16 for controlling the TV camera 13, and a microscope unit I/F circuit 17, thereby enabling the CPU 21 to control the respective units.

Also connected to the CPU bus 20 are a recording medium 22 such as a hard disk, the memory 23, display-use frame memory 24, an image capture I/F circuit 15 and a control I/F circuit 26 for controlling a key board and a mouse.

Technique of the present microscope system 100 is accomplished by various programs, such as a microscope control, image input, image process, image display, et cetera, which are stored in the recording medium 22.

The next is a description on an operation of the microscope system 100 configured as described above.

Figure 2:
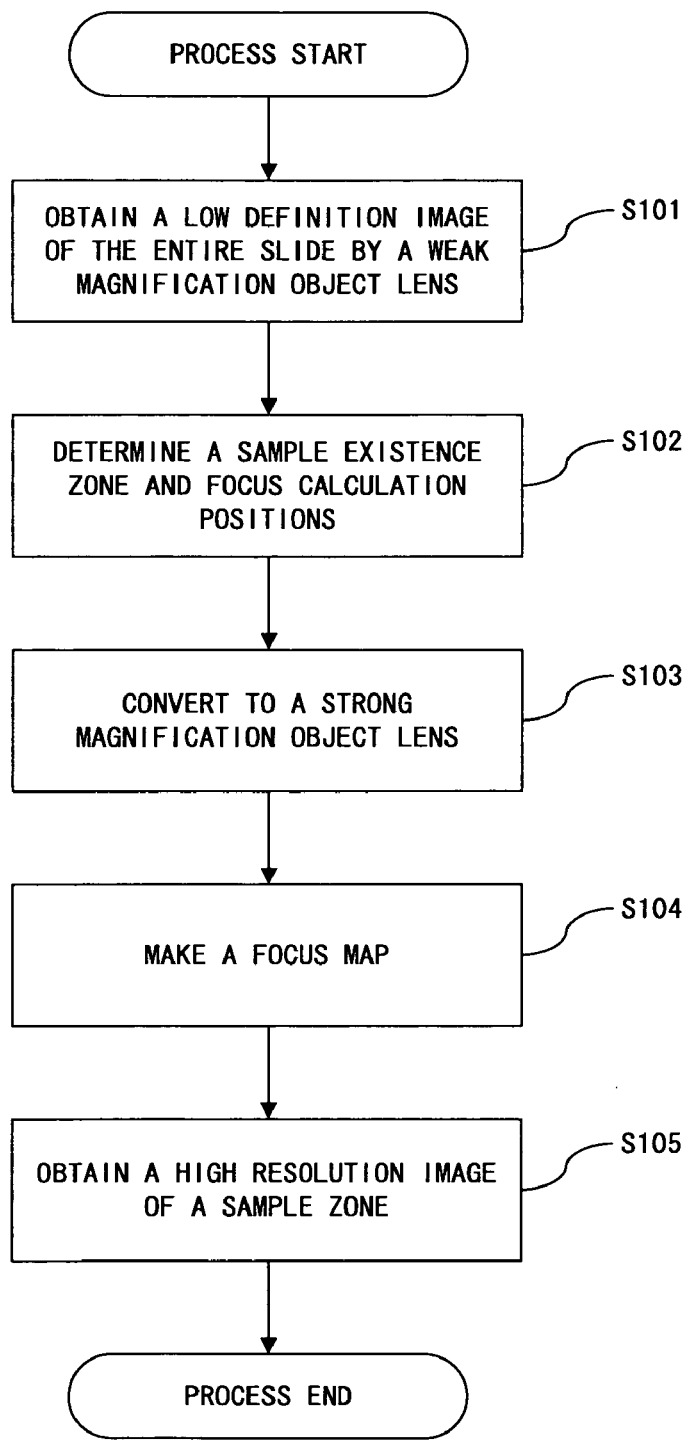
FIG. 2 is a flow chart showing an image input process flow.

FIG. 2 is a flow chart showing an image input process flow.

Figure 4:
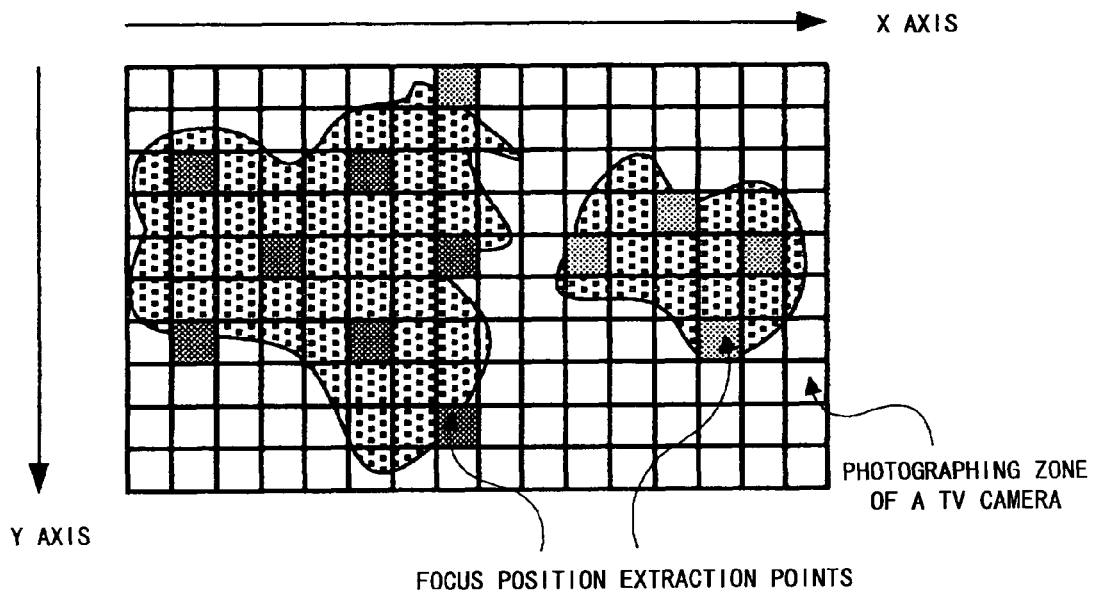
FIG. 4 is a diagram exemplifying a sampling part for acquiring a focusing position of an entire sample.

FIG. 3 is a diagram showing a sample placed on a slide glass; FIG. 4 is a diagram exemplifying a sampling part for acquiring a focusing position of an entire sample; and FIG. 5 is a diagram showing a coordinate map for obtaining a microscope image.

While the present image input process carries out an obtainment of a wide vision and high definition image, an example of the obtainment method is described in detail in a Laid-Open Japanese Patent Application Publication No. 09-281405 which has been filed by the present applicant, and therefore a summary description is provided herein by omitting its detail.

First, the step S101 shown in FIG. 2 inserts a low magnification object lens 10, such as 1.25× (i.e., a 1.25× magnification) into the light path, obtains a microscope image by way of the TV camera 13 by an XY-movement of the stage 8 in a predetermined zone (e.g., 25 mm vertical by 50 mm horizontal) of the slide glass 9 according to a photographing range width of the TV camera 13, performs a compounding of respective images, and stores the entire image of the slide glass in the recording medium 23.

Then the step S102 automatically detects a zone (i.e., determines a sample zone) of a sample S actually being placed on the slide glass 9 shown in FIG. 3 based on the entire image of the slide glass obtained in the above described step S101, and automatically detects focus position extraction points to be sampled (refer to FIG. 4) in order to determine individual focus positions for the entirety of the sample S from within the zone where the sample S exists.

Then the step S103 inserts a high magnification object lens 10, such as a predetermined 40× (i.e., a 40× magnification), into the light path, and moves the stage 8 in the X-Y directions so as to put each of the points extracted in the step S102 into the optical axis position, followed by inputting and evaluating the sample image by way of the TV camera 13 while a Z-movement control is performed, and acquiring an actual focusing position (i.e., coordinates).

Then the step S104 calculates focus positions (i.e., coordinates) of non-extraction points by interpolating from actually measured focusing positions (i.e., coordinates), makes a focus map constituted by the X, Y and Z coordinates, and stores it in the recording medium 22.

Then the step S105 moves the stage 8 to an XYZ coordinates registered in the focus map based on the information in the above noted focus map, inputs an image by way of the TV camera 13, and stores it in the recording medium 22 as an image file while compounding images of the adjacent positions.

A repetition of the present image input process until a completion for all the XYZ coordinates defined by the focus map completes the obtainment of the wide vision and high definition microscope image which is to be stored in the recording medium 22 as an image file.

Note that the processes from the steps S101 to S105 are configured to be automated so that an operator is enabled to complete the obtainment of a wide vision and high definition microscope image merely by placing a slide sample S on the stage 8 and performing a scan start operation by operating on an operation screen (not shown herein).

Also that an image file stored in the recording medium 22 is of course configured to be capable of a compression storage by a known compression algorithm such as JPEG and JPEG 2000.

In addition, it is of course configured in a manner to allow a temporary pause in each step and an operator intervention in an operation, enabling adjustment works in each step such as a change of sample zones, a change/addition/delete of focus position extraction points to be sampled and a magnification change of strong magnification object lens 10 to be used.

Furthermore, it is also of course configured to optimize the illumination system of a microscope associated with a replacement of the object lens 10.

It is also possible to have a separate macro photography optical system, in place of a weak magnification object lens 10, photograph the entirety of the slide glass 9 at once and shorten a photographing time of an image of the entirety of the slide glass 9.

It is further possible to eliminate a lack of continuity of images associated with a stage precision by moving across a predetermined overlap zone with an adjacent image when moving the stage 8 in the X-Y plane, and carrying out an image cut and paste process.

Figure 6:
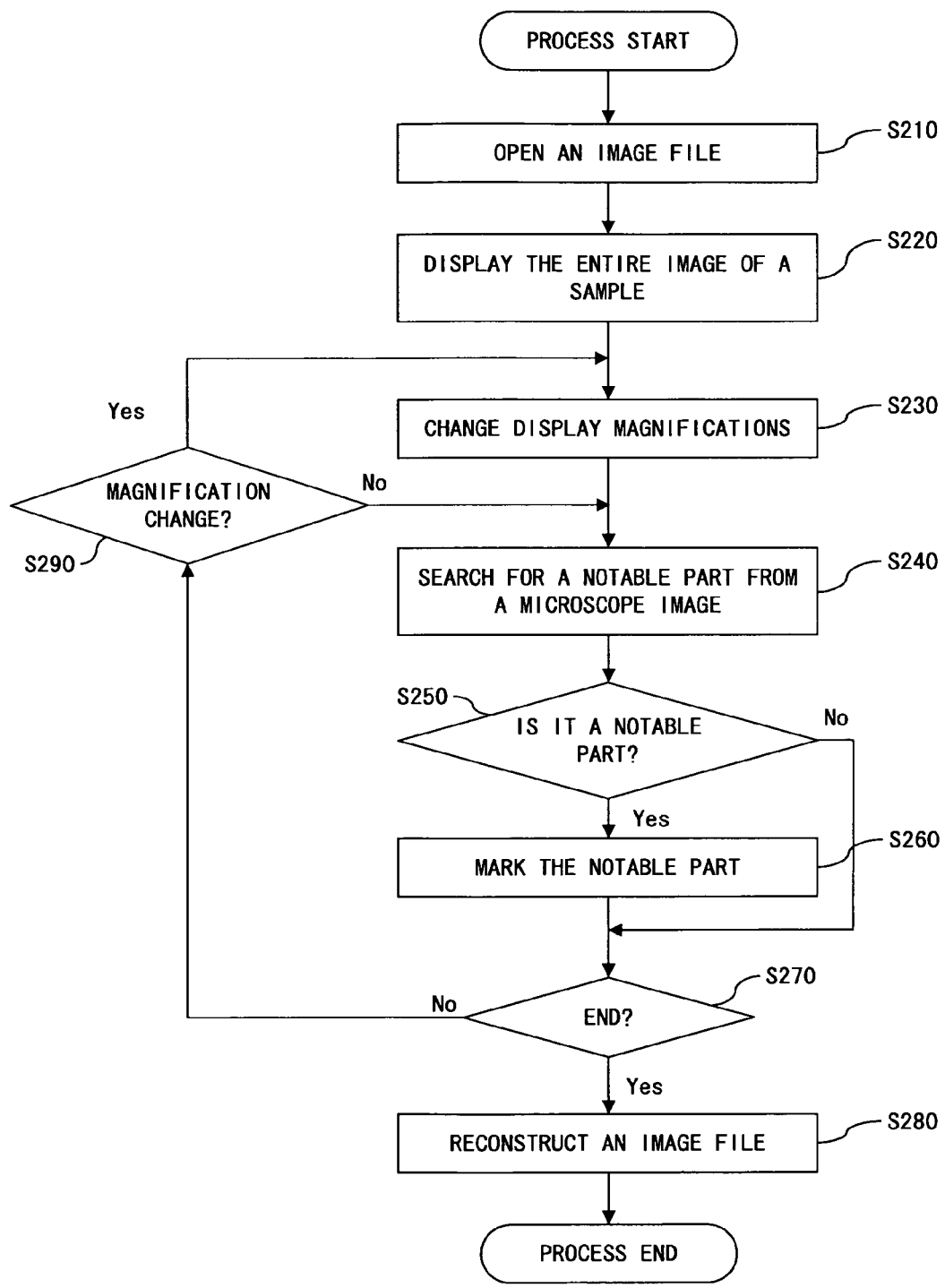
FIG. 6 is a flow chart for constructing a wide vision and high definition microscope image attached with a notable part.
Figure 7:
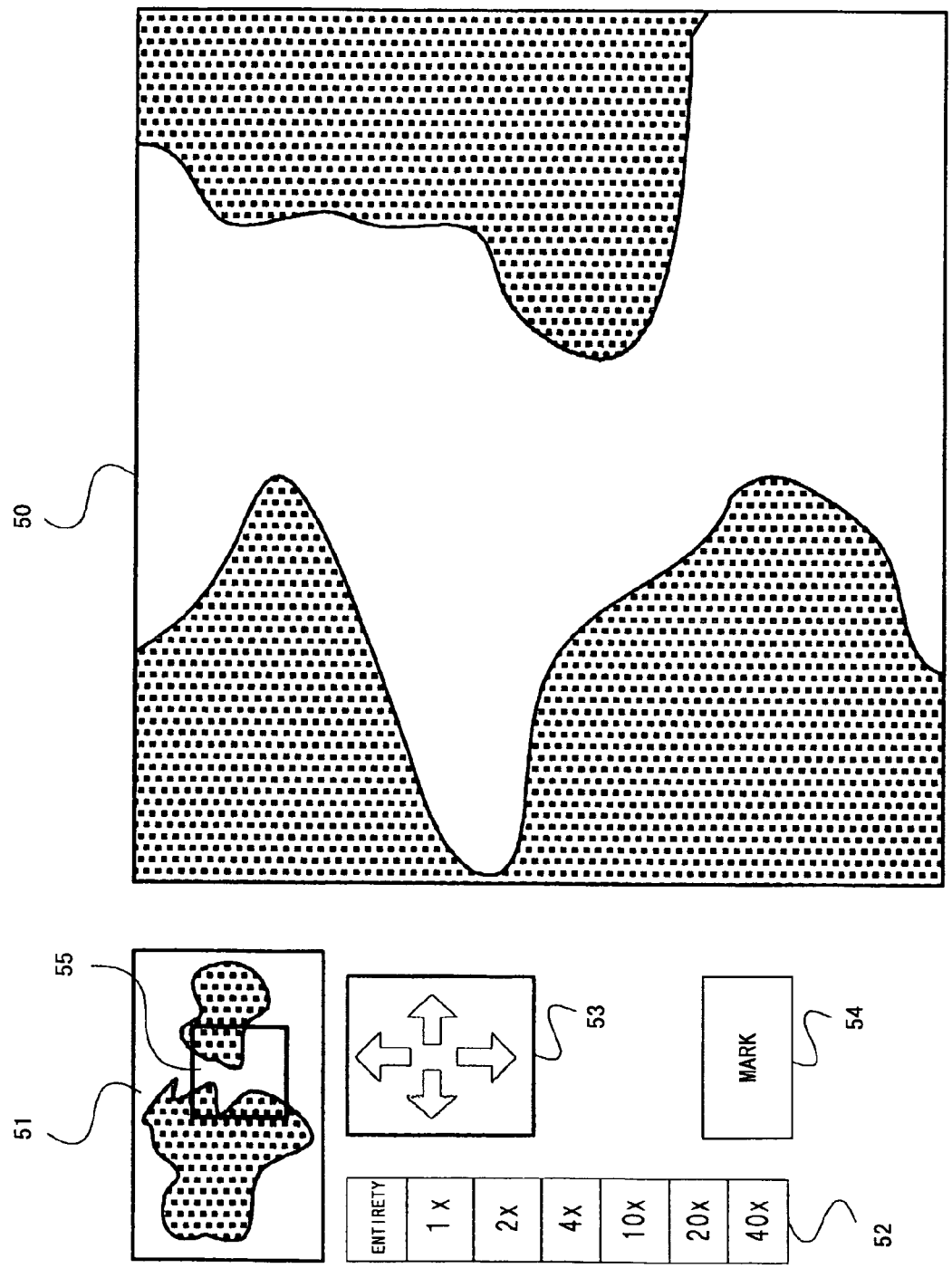
FIG. 7 is a diagram showing an operation screen for constructing a wide vision and high definition microscope image attached with a notable part.

The next is a description on an embodiment of recording, in a high resolution, only an important part in terms of an observation and diagnosis by an operation of an expert, such as a pathologist, with regard to a wide vision and high definition microscope image which has been constructed by the above described image input process, and of storing other parts in a reduced resolution, thereby reducing a file volume, by referring to FIGS. 6 and 7.

FIG. 6 is a flow chart for constructing a wide vision and high definition microscope image attached with a notable part; and FIG. 7 is a diagram showing an operation screen for constructing a wide vision and high definition microscope image attached with a notable part.

Figure 9:
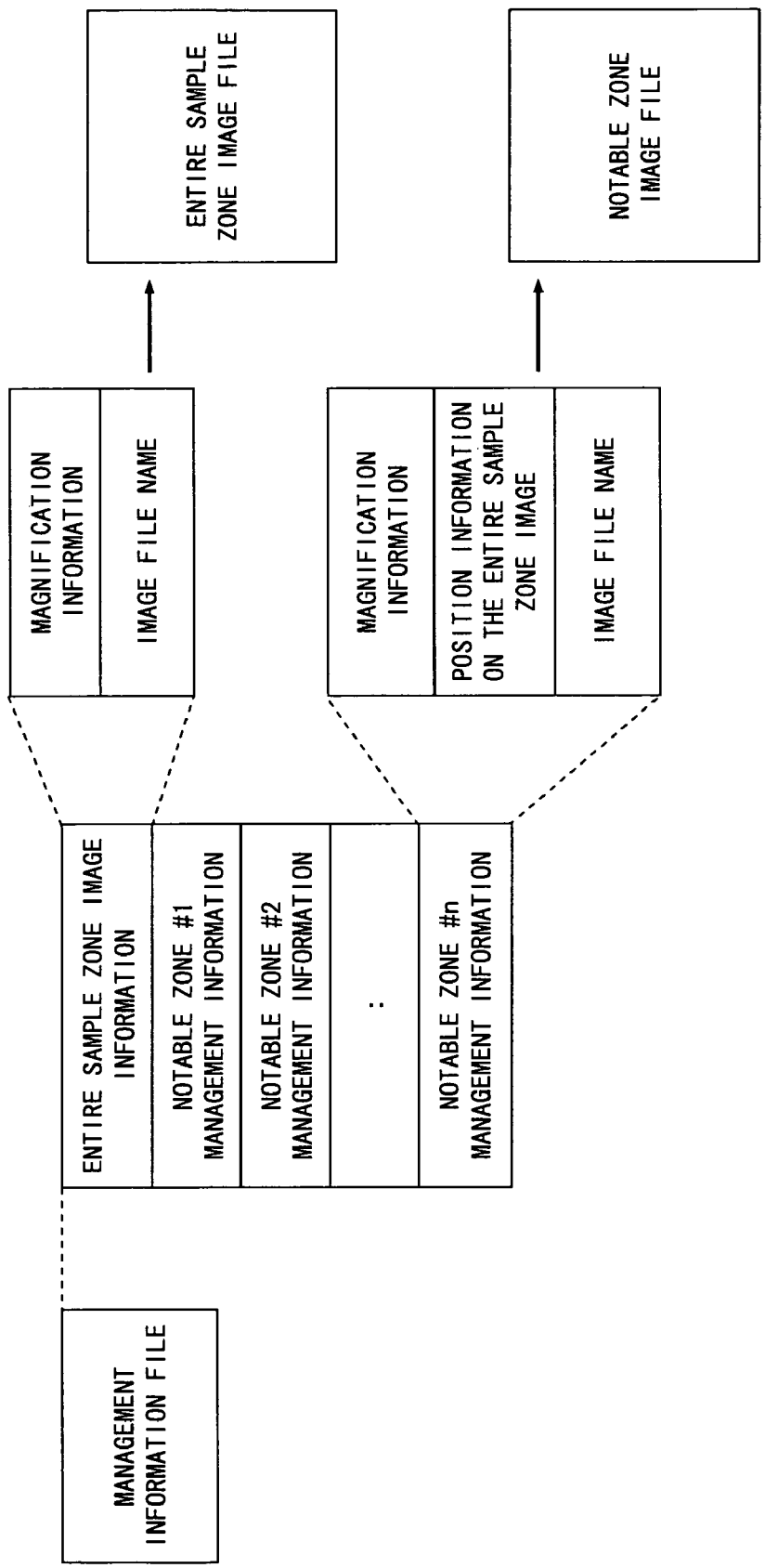
FIG. 9 is a diagram showing a second example of a file structure of a wide vision and high definition microscope image attached with a notable part.

FIG. 8 is a diagram showing a first example of a file structure of a wide vision and high definition microscope image attached with a notable part; and FIG. 9 is a diagram showing a second example of a file structure of a wide vision and high definition microscope image attached with a notable part.

First, the step S201 shown in FIG. 6 opens, by an operation (not shown herein), a wide vision and high definition microscope image stored in the recording medium 22.

The above step is followed by the step S220 displaying an operation screen of FIG. 7 in the display apparatus 25. A main screen 50 initially displays the entirety of image in an appropriate magnification so as to display the entirety of the obtained sample image, enabling a pathologist to grasp the entirety of the obtained sample image.

Then the step S230 clicks on a display magnification change button 52 by the mouse 28, thereby selecting a desired weak or strong magnification. If a 1× (i.e., a 1× magnification) is selected for example, a part of a microscope image with the resolution being lowered to one fortieth (1/40) by a thin-out process is displayed in the main screen 50 in the case of a microscope magnification being 40× (i.e., a 40× magnification) at the time of obtaining the image.

A reduced size image of the entire sample is always displayed in an entire sample image navigation screen 51, in which currently displayed is an observation in-progress rectangular cursor 55 for indicating an observation zone displayed in the main screen 50, thereby enabling the pathologist to easily grasp what part of the sample is currently magnified and observed.

Then, the step S240 moves a part to be observed and search for an abnormal notable part such as a malignant tumor by an operation of a view field movement button or arrow key on the key board 27 or drag operation, et cetera, of the mouse 28 in the main screen 50.

If a notable part is found ("yes" for S250), the step S260 clicks on a mark button 54 by the mouse 28, thereby recording, in the memory 23, an observation zone currently displayed in the main screen 50 as a notable zone.

Note that a configuration may of course be in a manner to determine a notable zone by entering a notable zone designation mode by clicking on a mark button 54 with a mouse, followed by designating a rectangle by a drag operation of the mouse 28 within the main screen 50.

Then, in the case of searching for a notable part ("yes" for S290), the operations from the steps S230 to S260 are repeated according to a necessity or un-necessity of changing magnifications.

If a search and marking for a notable part is completed ("yes" for S270), the step S280 reduces an information volume (i.e., resolution) of the entirety of the original image while maintaining an information volume of the notable zone, thereby storing a wide vision and high definition microscope sample image attached with notable zone information by a file structure as shown in FIG. 8, which has reduced a file volume for recording and retaining in the state of maintaining an appropriate information volume according to the notable part and un-notable part, in the recording medium 22.

Note that it is configured to have a capability of selecting a predetermined magnification, such as being equivalent to a 4× (i.e., a 4× magnification) object lens, or a discretionary magnification weaker than the magnification of the object lens at the time of obtaining the present image by an operation (not shown herein) for selecting a magnification, as to how much of an information volume (i.e., resolution) to be reduced for an un-notable part.

For example, in the case of obtaining a wide vision and high definition image of a microscope sample S by using a 40× (i.e., a 40× magnification) object lens 10, a reduction of an information volume equivalent to a 4× (i.e., a 4× magnification) makes it possible to reduce an entire sample zone image volume to one hundredths (1/100), and a reduction of the information volume equivalent to a 10× (i.e., a 10× magnification) makes it possible to reduce it to one sixteenths (1/16).

Note that what equivalence of magnification has been used for converting the entire sample zone is recorded as information as shown within FIG. 8.

The notable zone image information stores notable zone management information such as magnification information at the time of obtaining a wide vision and high definition image of a microscope sample, position information on an entire sample zone image and a pointer to the next notable zone image information; and image data retaining an information volume of the original image within the range designated by the above noted position coordinates.

Note that an alternative configuration may be such as to comprise a management information file of a text base, an entire sample weak magnification image file and one or a plurality of notable zone image files as shown in FIG. 9; and store as a common file structure enabling a handling by commercially available software, Web browser software, et cetera.

Note further that a configuration may be such that a magnification for storing each notable zone is individually and discretionary selected within a range between a magnification larger than a conversion magnification for reducing information volume of the entire sample zone and a magnification no larger than one for obtaining a wide vision and high definition image of a microscope sample, that is, an original image, by a selection operation (not shown herein).

As described above, the present first embodiment enables the construction of a wide vision and high definition microscope image by an operation by a general operator in lieu of an expert such as a pathologist, and additionally enables the reduction of a memory volume for a storage while securing a necessary and appropriate information volume by recording only a notable zone of the image and reducing an information volume (i.e., a resolution) of the entire sample by an operation by an expert such as a pathologist.

The next is a description on a second embodiment.

Figure 10:
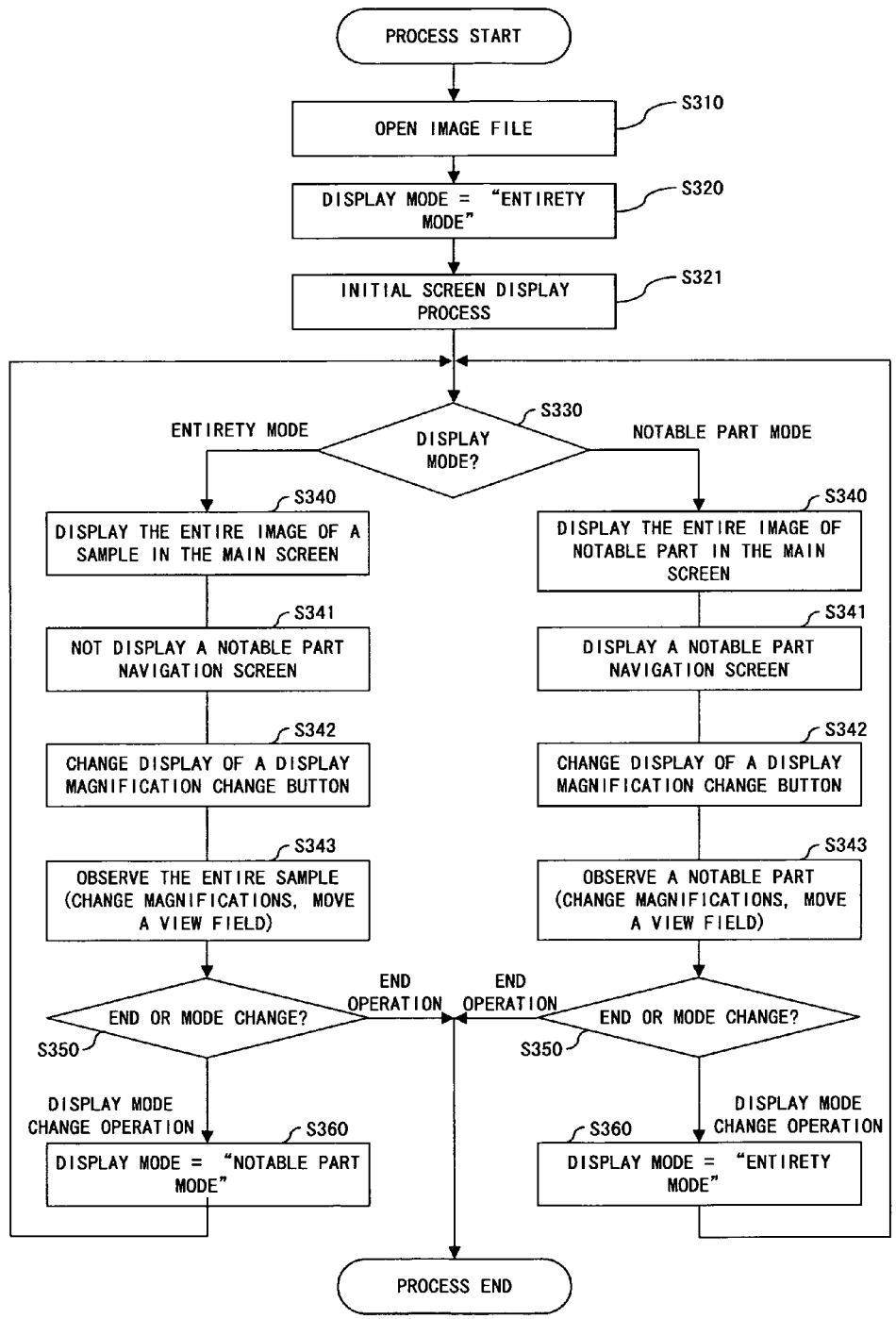
FIG. 10 is a flow chart showing an operation for observing a wide vision and high definition microscope image attached with a notable part.
Figure 11:
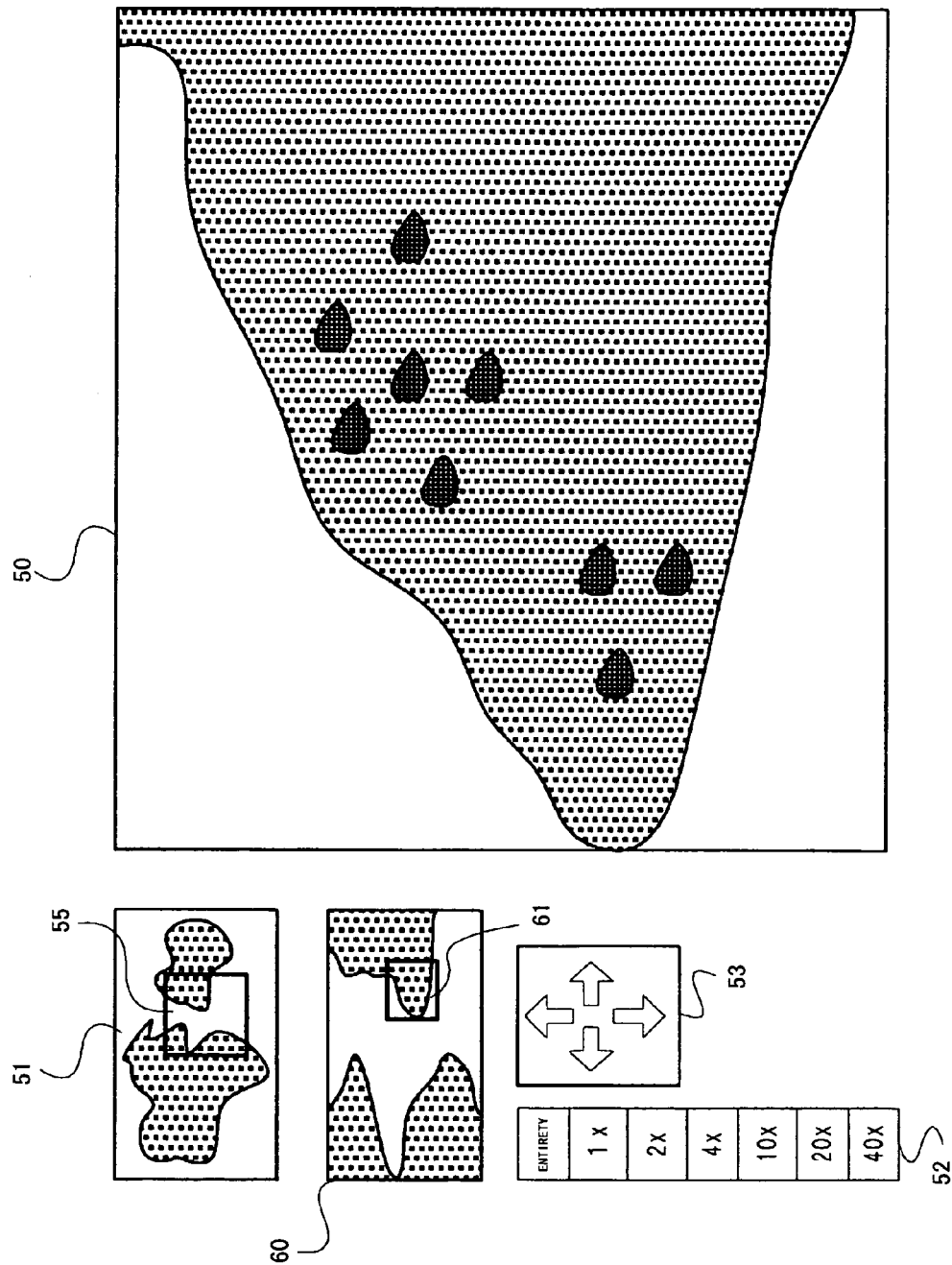
FIG. 11 is a diagram showing an observation screen of a wide vision and high definition microscope image attached with a notable part.

FIG. 10 is a flow chart showing an operation for observing a wide vision and high definition microscope image attached with a notable part; and FIG. 11 is a diagram showing an observation screen of a wide vision and high definition microscope image attached with a notable part.

First, the step S310 opens a wide vision and high definition microscope image file attached with a notable part which has been described in the above noted first embodiment.

Then the step S320 sets an "entirety mode" as an initial value of a display mode and the step S321 performs an initialization process for displaying an operation screen shown in FIG. 11. For example, the contents are to thumbnail the entire sample image in the entire sample image navigation screen 51, display a view field movement button 53, et cetera.

Process contents of the steps hereafter are different between the "entirety mode" and "notable part mode" (according to a judgment in S330) of a display mode, a description here is provided by the unit of step, however.

In the step S340, the main screen 50 displays, as the initial value, the entire image of a sample obtainable from image data of the entire sample zone in the case of the "entirety mode", while, as the initial value, the entire image of a notable zone selected by a later described user selection operation in the case of the "notable part mode".

In the step S341, a notable part navigation screen 60 shows nothing in the case of the "entirety mode", while turns to a displaying mode in the case of the "notable part mode", displaying the entire image of the selected notable zone as a thumbnail.

In the step S342, the display magnification change button 52 shows a selectable magnification according to a display mode. The magnification of the "entirety mode" shows magnification information of the entire sample zone image stored in the present image file as the maximum magnification, while that of the "notable part mode" shows magnification information stored in the management information of the notable part as the maximum magnification.

Then, in the step S343, the entire sample is observed in the "entirety mode", while the notable zone is observed in the "notable part mode".

That is, to move a part for a main observation by changing magnifications by a selection of the display magnification change button 52, by operating the view field movement button 53 or arrow key of the key board 27, or by a drag operation of the mouse 28 in the main screen 50, et cetera, and display a target zone on the main screen 50 for observation. Incidentally, in association with a change of observation magnification and a moving a view field, a zone display indicating such as which part is presently observed is displayed in each navigation screen by a rectangle.

In the case of the "entirety mode", which zone of the entire sample image displayed in the main screen 50 is observed is displayed by the observation in-progress rectangular cursor 55 within the entire sample image navigation screen 51.

And, if one or plurality of notable zones registered as notable part(s) exists within the present observation zone, it is, or they are, displayed in the main screen 50 by a rectangle(s).

In the "notable part mode", the selected notable zone is displayed by a rectangle in the observation in-progress rectangular cursor 55 within the entire sample image navigation screen 51, and a notable part zone indicated by the main screen 50 is displayed by a rectangle in an in-observation rectangle cursor 61 within a notable part navigation screen 60.

Then the following operation is performed if a display mode is changed (S350).

A change from the "entirety mode" to "notable part mode" changes to a mode for displaying a notable part by an operation of double-clicking a notable part display rectangle cursor (not shown herein), which is displayed in the main screen 50, with the mouse 28. Contrarily, a transition from the "notable part mode" to "entirety mode" is carried out by pressing the "Esc" key of the key board 27.

As described above, the present second embodiment makes it possible to exhibit a rationale of knowledge as to which zone is selected as a notable part and also simultaneously observe different magnification information, such as the entire sample image, weak magnification image and strong magnification image, in correlation, thereby enabling an easy grasp of a morphological characteristic.

The next is a description on a third embodiment.

Figure 12:
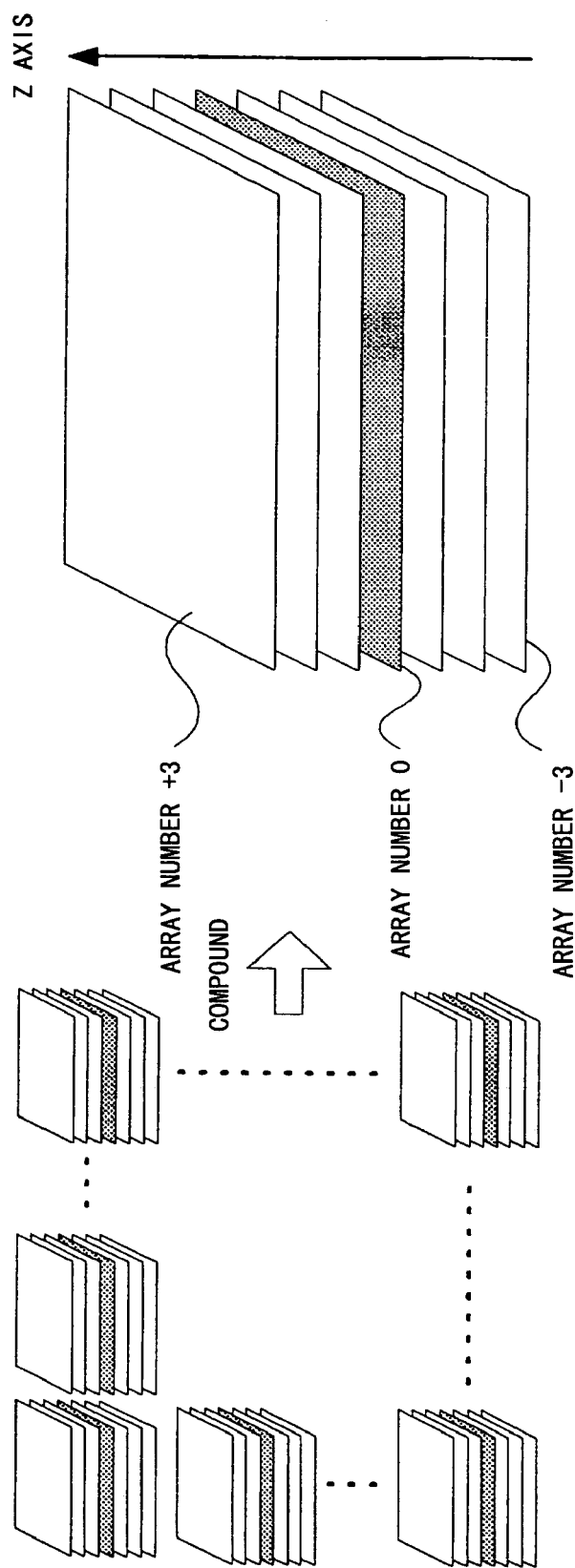
FIG. 12 is a diagram showing a manner of compounding a wide vision and high definition microscope image having different focus points.
Figure 13:
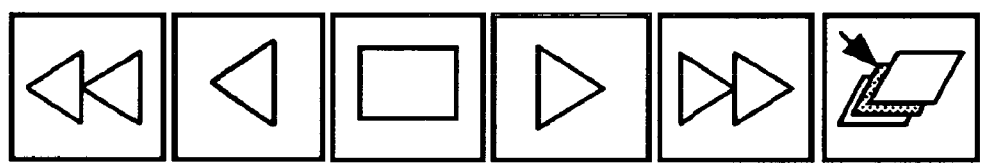
FIG. 13 is a diagram showing operation buttons for displaying different focus points.
Figure 14:
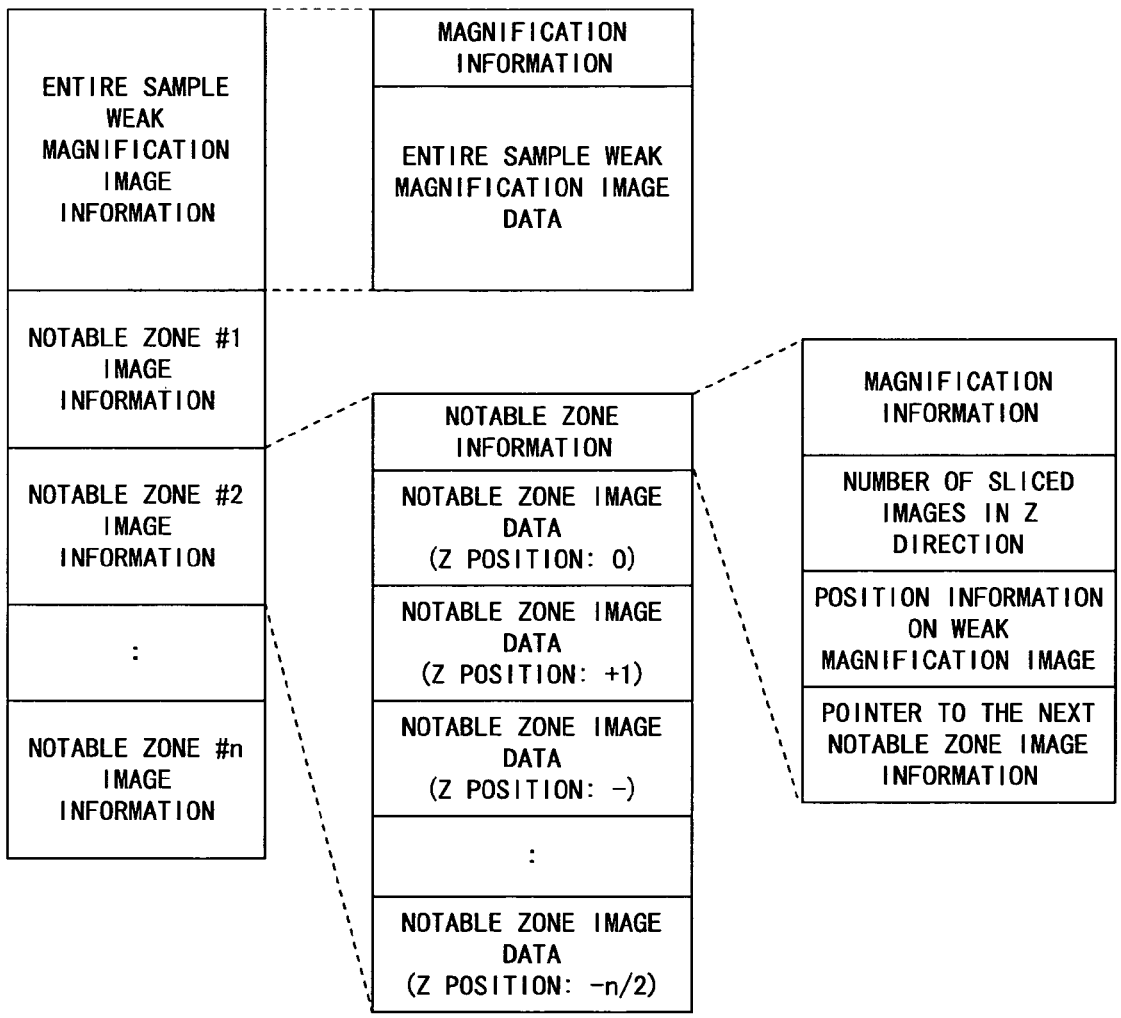
FIG. 14 is a diagram exemplifying file structures of a multiple focus-point, wide vision and high definition microscope image attached with a notable part.

FIG. 12 is a diagram showing a manner of compounding a wide vision and high definition microscope image having different focus points; FIG. 13 is a diagram showing operation buttons for displaying different focus points; and FIG. 14 is a diagram exemplifying file structures of a multiple focus-point, wide vision and high definition microscope image attached with a notable part.

In the third embodiment, a method for obtaining a three-dimensional wide vision and high definition image having different focus positions is described by using FIG. 2 which has been used for describing the first embodiment.

The steps S101 through S104 are the same as in the case of the first embodiment and therefore its description is omitted here.

Then, the process in the step S105 moves the stage 8 to an XYZ coordinates registered in the focus map based on the focus map information of FIG. 5, moves the Z coordinate up and down by a predetermined distance (which is determined by a focal depth of an object lens 10) with the Z coordinate defined by the focus map as the center (i.e., an array number 0), inputs a plurality of microscope images with different focus positions by way of the TV camera 13, and stores in the recording medium 22 as an image file while compounding with images of adjacent positions on the X-Y plane of the same Z axis array number as shown in FIG. 12.

A repetition of the present image input process until a completion for all the X-Y coordinates defined by the focus map completes an obtainment of a wide vision and high definition microscope image with different focus positions, which is then stored in the recording medium as an image file.

The multiple focus-point, wide vision and high definition image obtained in the above described step is converted into a multiple focus-point, wide vision and high definition microscope image attached with notable part information by the same method as the process flow of FIG. 6 and the operation screen of FIG. 7 which have been described for the first embodiment, thereby enabling a reduction of a memory volume for storing it.

The following is a description of a process of a part unique to the present third embodiment.

The step S210 shown in FIG. 6 opens an image file of the Z-central coordinate (i.e., the array number 0) which is calculated as focus position at the time of obtaining the image.

In the process for searching a notable part from the microscope image in the step S240, an operation of a focus movement button shown in FIG. 13, in addition to the above described view point movement, performs a repeated Z-axis image replay in a frame-by-frame advance, "+ direction→− direction→+ direction" or "− direction→+ direction→− direction" for enabling an observation of sample images having different focus position in the main screen 50.

Then, the following process is performed in an image file reconstruction process of the step S280:

The process retains all original image information including images having different focus positions for a notable part, while compounds a single image focused also on a material(s) existing in a different position(s) in the optical axis direction from a plurality of images having different focus positions by a known image addition and recovery filtering processes for the entirety of a sample S, also reduces the resolution, as in the process described for the first embodiment, and stores it in the recording medium 22 by the structure shown in FIG. 14.

For example, in the case of obtaining a wide vision and high definition image having information with eleven different focus positions by using a 40× (i.e., a 40× magnification) object lens 10; if the information volume is reduced to one equivalent to 4× (i.e., a 4× magnification), the image information volume of the entire sample zone can be reduced to $1/100$, or if the information volume is reduced to one equivalent to 10× (i.e., a 10× magnification), it can be reduced to $1/176$.

A multiple focus wide vision and high definition microscope image attached with notable part information stored in the recording medium 22 by the above described process can be observed likewise by the method described for the second embodiment. In addition, in the case of a display mode being "notable part mode", the focus movement buttons shown by FIG. 13 are displayed in the operation screen, enabling an observation of images having different focus positions.

An integration of a storage magnification of each notable zone and a plurality of images having different focus positions into a single image and a capability of selectively reducing an information volume of notable zones make it possible to further reduce a storage volume for recording.

As described above, the present third embodiment enables an observation of a cytological sample and even a tissue sample of a certain thickness, specifically, intussusception information of a cell, details of a nucleus, et cetera, in various focusing in the optical axis direction by changing focus positions in a notable part.

In addition, a problem of a mis-focus caused by calculating a focus position of a sample by predicting from information of surroundings can be avoided.

As such, each of the embodiments has been described by referring to the accompanying drawings; a microscope system to which the present invention is applied, however, may of course be a single apparatus, a system or integrated apparatus comprising a plurality of apparatuses, or a system for carrying out a process by way of a network such as LAN, WAN, et cetera, provided that the function of the microscope system can be carried out, in lieu of being limited to the above described individual embodiments.

The microscope system can also be accomplished by a system comprising a CPU, memory such as ROM and RAM, an input apparatus, an output apparatus, an external recording apparatus, a media drive apparatus, a portable storage medium, and a network connection apparatus, with all of which being connected to a bus. That is, it is apparently possible to accomplish the microscope system by supplying it with the memory, such as ROM and RAM, external storage apparatus and a portable storage medium which record a program code of the software implementing a system configured by the above described individual embodiments, and a computer comprised by the microscope system reading and executing the program code.

In this case, the program code per se which is read from the portable storage medium, et cetera, implements new function of the present invention, making the portable storage medium recording the program code constitute the present invention.

A portable storage medium for supplying the program code can use, for example, flexible disk, hard disk, optical disk, magneto optical disk, CD-ROM, CR-R, DVD-ROM, DVD-RAM, magnetic tape, nonvolatile memory card, ROM card, various storage media recording the program by way of a network connection apparatus (i.e., a telecommunication line in other words) such as e-mail and PC communications.

Also, the above described function of each embodiment can be implemented by a computer executing the program code read out to the memory, and it is also implemented by a process as a result of an operating system (OS) working in the computer executing a part of the actual processes or the entirety thereof based on instructions of the program code.

Furthermore, the program code read from a portable storage medium or the program (and data) provided by a program (and data) provider is written to memory which is comprised by a function extension board inserted into a computer or comprised by a function extension unit connected thereto, followed by a CPU, et cetera, comprised by the function extension board or function extension unit executing a part of the actual process, or the entirety thereof, based on an instruction of the program code, thereby enabling an implementation of the functions of the above described individual embodiments.

That is, the present invention allows an adoption of various configurations or forms possible within the scope thereof, in lieu of being limited to the above described each of the individual embodiments.

The present invention is contrived to enable anyone to easily obtain a multiple focus, wide vision and high definition microscope image and reduce a storage volume for a recording by changing an information volume appropriately in a notable and non-notable parts.

The present invention is also contrived to exhibit a notable part, thereby making it possible to define a target part of knowledge obtained from the present sample.

The present invention is also contrived to enable a simultaneous observation of an extra weak magnification macro image, such as the entirety of a sample, and a weak and strong magnification images, thereby making it possible to easily obtain morphological knowledge from a sample.

What is claimed is:

1. A microscope system, comprising:
   a microscope unit; and
   a control computer unit;
   wherein the control computer unit comprises:
   an image information obtainment unit for obtaining a plurality of first adjacent microscope images on a first plane and obtaining image information of an entirety, or a part, of a sample by combining the plurality of first adjacent microscope images, and for obtaining a plurality of second adjacent microscope images on a second plane whose focus position is different in a direction of an optical axis and obtaining image information of the entirety, or the part, of the sample by combining the plurality of second adjacent microscope images, to thereby obtain three-dimensional image information of the entirety, or the part, of the sample, by moving an object lens and the sample relatively to each other in both a direction perpendicular to the optical axis and in the direction of the optical axis;

a specific zone designation unit for designating a specific zone out of the image information of either the first plane or the second plane obtained by the image information obtainment unit;

a specific zone image storage unit for storing image information of the specific zone designated by the specific zone designation unit, the image information of the specific zone retaining original image information of the first plane and the second plane;

an image information reduction unit for reducing an information volume of image information being not designated by the specific zone designation unit among the image information obtained by the image information obtainment unit;

a reduction image storage unit for storing the image information reduced by the image information reduction unit; and an image position relationship storage unit for storing a positional relationship between the image information stored by the specific zone image storage unit and the image information stored by the reduction image storage unit;

wherein the image information stored in the specific zone image storage unit retains original image information in which images on the first plane and the second plane that correspond to the specific zone are integrated into a single image.

* * * * *